Aug. 20, 1957  R. F. FISHER  2,803,150
DIFFERENTIAL GEAR LOCKING MECHANISM
Filed June 22, 1955  3 Sheets-Sheet 1
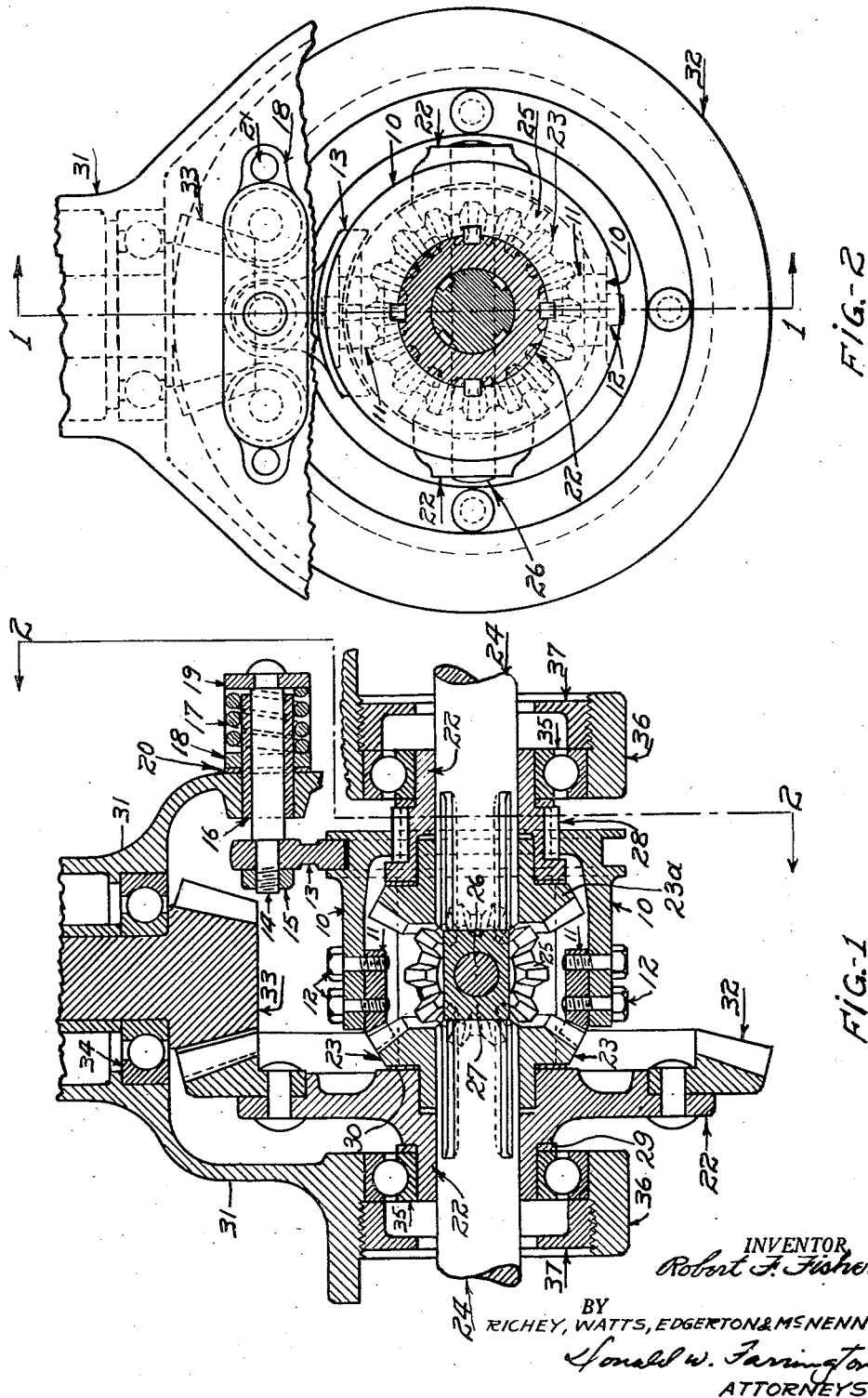

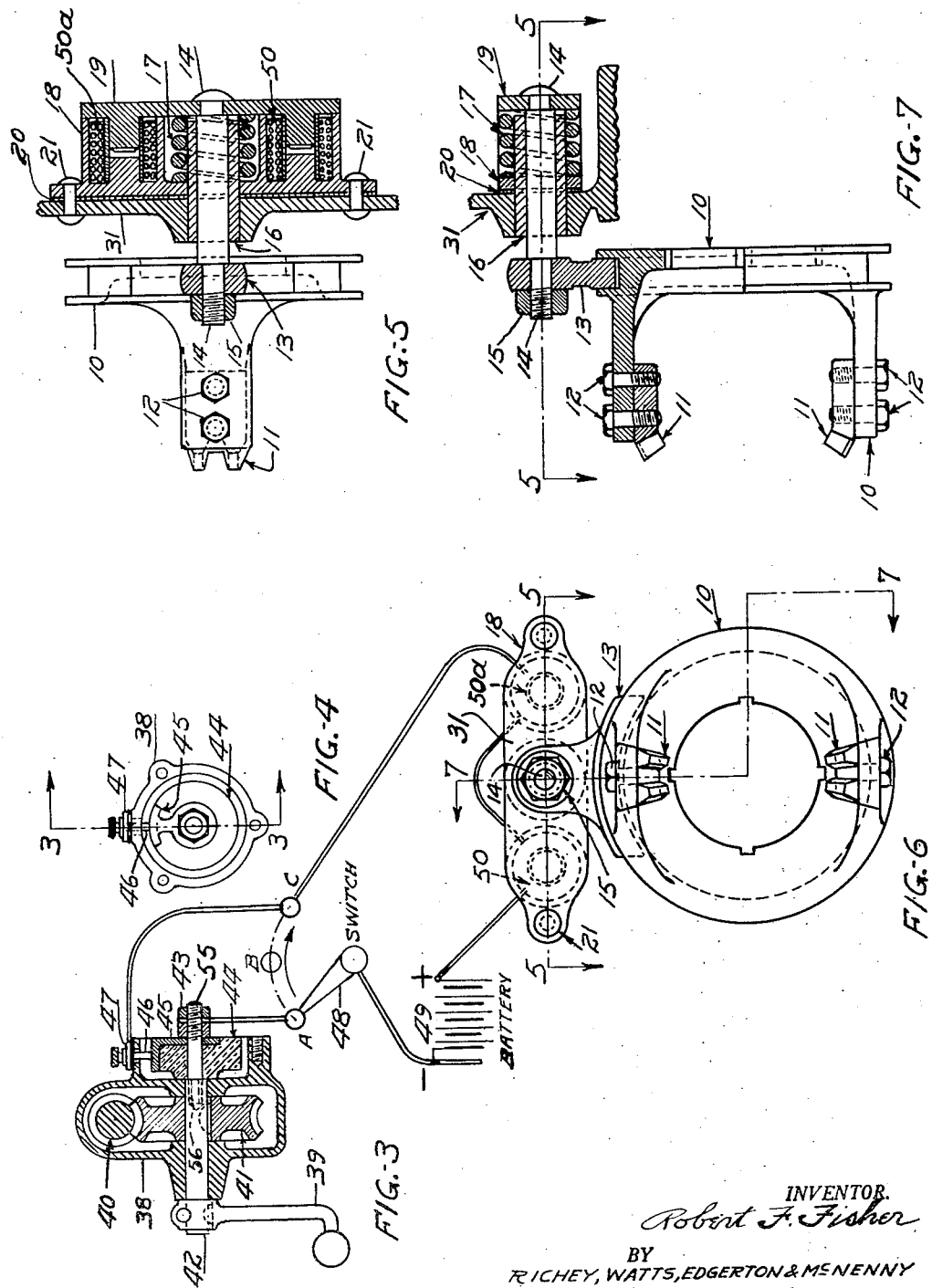

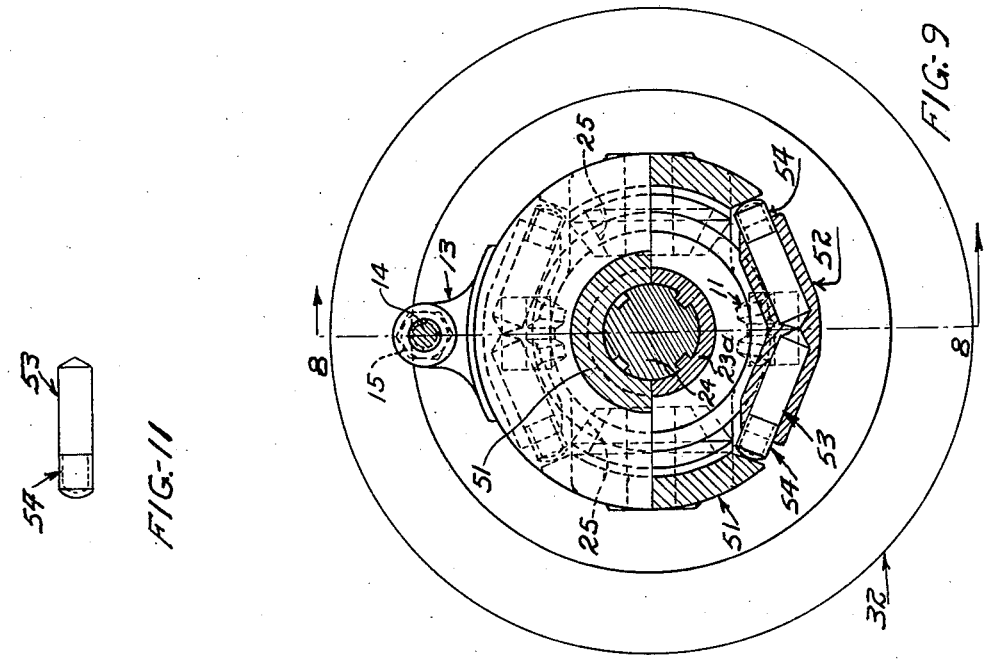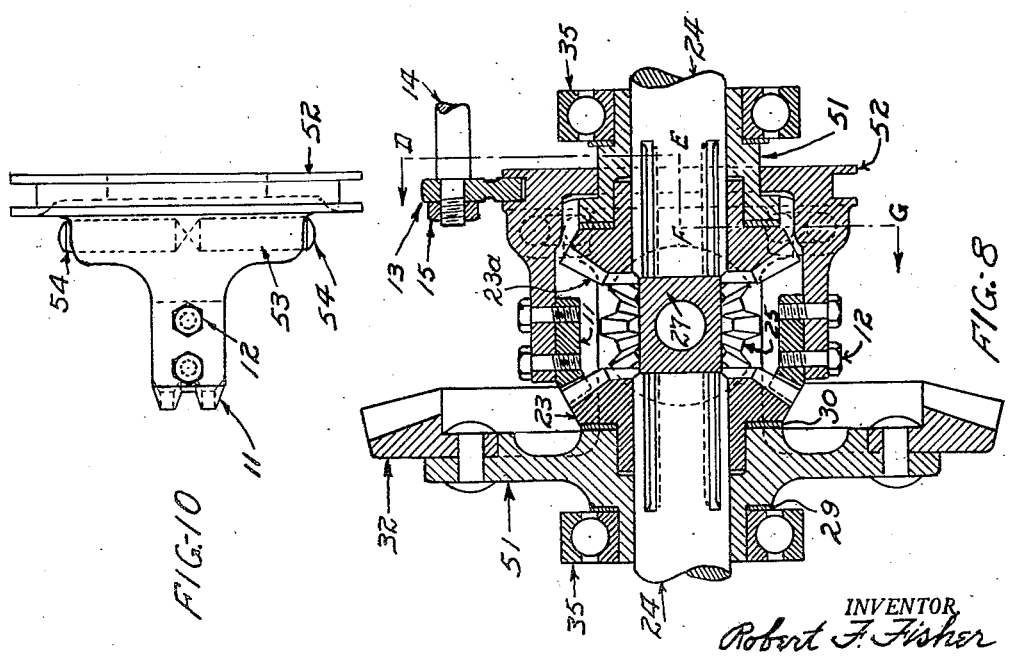

United States Patent Office 2,803,150
Patented Aug. 20, 1957

2,803,150

DIFFERENTIAL GEAR LOCKING MECHANISM

Robert F. Fisher, Cleveland, Ohio

Application June 22, 1955, Serial No. 517,191

10 Claims. (Cl. 74—710.5)

This invention relates to improvements in motor driven axle differential gears, such as used on automobiles and motor trucks.

One of the principal objects of this invention is to provide means for locking the differential gears of a motor vehicle together and thereby to provide a positive driving action to both rear wheels when differential action is not required.

Another object of this invention is to provide means for remote electric control in connection with a clutch in the differential gear case of a motor vehicle and means for shifting said clutch to engage and lock said differential gears when positive driving action to both wheels is required, and a coil spring to release said clutch when differential action is desired.

Another object of this invention is to provide a new type of differential gear control for a motor vehicle, this new mechanism which can be manually moved in or out of action according to the condition of road surface and can give positive driving action to each rear wheel regardless of the road surface.

Another object of this invention is to provide an electromagnetic device controlled by the operator of a motor vehicle in connection with a differential gear clutch shifter whereby the tractive power is delivered to each rear wheel of the vehicle.

Another object of this invention is to provide a means for locking the differential gears of a motor vehicle and delivering power to one rear wheel in case of an emergency, such as a broken axle on one or the other wheel.

Another important object of this invention is to provide a floating differential gear clutch with synthetic rubber shock absorbers mounted on the clutch ring or fork. Said absorbers will cushion the shock when engaging the clutch gear teeth.

Another object is to provide a clutch with removable teeth and synthetic rubber shock absorbers adapted for replacement when worn.

Another object is to provide an enclosed double-coil magnetic clutch shifter device, said magnetic device being insulated magnetically from the steel axle gear housing.

Another object is to provide a differential gear clutch and shifter device which is enclosed in the vehicle axle housing.

Another object is to provide a differential gear which will cam or wedge the clutch teeth out of mesh with said gear when the torque on the axle shaft is excessive and will ratchet the clutch teeth out of or into mesh until the load is normal.

Another object of this invention is to provide a steering gear shaft control of the said magnetic clutch shifter to cut off the electric circuit to the magnetic clutch shifter and thereby to automatically release the differential gear clutch, when going around curves on the road, so as to resume normal differential gear action.

Another object is to provide an electric control to the differential gear clutch having a three contact point electric switch mounted on the vehicle dash panel or steering wheel post and providing for manual or automatic control of said magnetic clutch control.

Other objects and advantages of the invention will become apparent from the following detailed descriptions and arrangements of parts as shown in the drawings which illustrate the preferred forms, but I do not wish to be limited to exact details which can be varied to suit construction or design.

Referring to the drawings:

Fig. 1 is a sectional view of a motor vehicle rear axle differential gear case and the gears embodying the invention with a clutch ring keyed to the differential gear housing;

Fig. 2 is an end view and a section taken on lines 2—2 of Fig. 1;

Fig. 3 is a sectional view of a motor vehicle worm and gear steering device having an electric commutator and contact brush mounted thereon and diagrammatically showing the wiring circuit and three point electric switch member and battery;

Fig. 4 is an end view of the electric commutator and brush shown in Fig. 3;

Fig. 5 is a top view of the clutch fork and shoe, a sectional view of an electromagnetic device and a coil spring adapted to move the gear clutch shifter shoe;

Fig. 6 is a fragmentary end view of the clutch ring, clutch teeth and shifter shoe, an electromagnetic device, and wiring connections;

Fig. 7 is a side view and section taken on lines 7—7 of Fig. 6.

Fig. 8 is a sectional view taken on lines 8—8 of Fig. 9, illustrating a full floating clutch shifter with rubber shock absorbers;

Fig. 9 is a fragmentary end view taken on lines D—E—F—G of Fig. 8 embodying the invention having rubber shock absorbers and a clutch ring adapted to slide endwise on the differential case hub and is adapted to rotate a few degrees;

Fig. 10 is a top view of a floating clutch ring and shock absorbers mounted therein; and Fig. 11 is a side view of a rubber shock absorber plug with the metal cap.

The conventional automotive rear axle mechanism comprising the usual housing, drive shaft, driven shafts and bevel gears meshed with planetary gears is utilized in connection with my invention.

Referring more particularly to the drawings, wherein like numerals designate similar parts throughout the various views, the form shown in Fig. 1 shows a sectional view of a portion of a conventional automobile rear axle gear assembly and housing with my new differential clutch and electromagnetic clutch shifter device mounted in and on the axle housing.

The said differential clutch assembly has a differential clutch ring and fork 10 having clutch engagement gear teeth fingers 11 secured to said clutch ring fork 10 by cap screws 12. The said clutch ring 10 is provided with a clutch shifter shoe 13 which rides in a groove turned in the circumference of said clutch ring 10, and which is electrically and mechanically controled through a non-magnetic clutch shifter shoe shaft 14. The said shifter shoe 13 is secured to the shaft 14 by means of a nut 15. Said shaft 14 is provided with a non-magnetic bushing 16 placed between the said housing 31 and the said shaft 14. The said bushing 16 has a coil spring 17 mounted thereon and said spring is adapted to release said clutch ring fingers 11 from engagement with the side gear 23. A magnetic case 18 is secured to the axle housing 31 and placed in line with clutch shoe 13. An armature 19 is secured to the shifter shoe shaft 14 and is energized with electric coils 50 and 50a. A non-magnetic shim 20 is interposed between axle housing 31 and the magnet case 18. The magnet case and the said interposed shim 20 are rigidly secured to said axle housing 31 by two rivets 21 as shown in Fig. 5.

A differential gear housing or case 22 has beveled side gears 23 and 23a mounted therein that are keyed to axle shafts 24 and is provided with differential pinion gears 25 which mesh with the said side gears 23 and 23a. The said gear case 22 has a differential pinion shaft 26 mounted therein and an axle shaft end thrust bearing block 27 which surrounds said pinion shaft 26. The keys 28 are securely affixed in keyways in the said differential housing 22, as shown in Figs. 1 and 2, and are slidably keyed to said clutch ring 10. Interposed between the differential axle housing ball bearing 35 and the said gear case 22 is a differential housing bearing thrust washer 29. A differential housing gear thrust washer 30 is interposed between said differential gear housing 22 and said differential side gear 23.

A rear axle ring gear 32 is rigidly affixed to the differential gear housing 22. A rear axle ring gear pinion 33 is provided to drive said ring gear 32. Ball bearing 34 is mounted in the axle housing 31 as a bearing to support the ring gear pinion 33. The differential case ball bearing cap 36 is secured to said housing 31 and having therein a ball bearing adjusting screw cap 37 which is mounted in housing 31 and adapted to gear adjustment.

I have provided a steering gear shaft control for the said magnetic clutch shifter device as shown in Figs. 3 and 4. The said control mechanism has a steering gear and worm housing 38 which encloses a worm 40 and a steering worm gear 41. The said gear 41 is mounted on and keyed to a shaft 42. I have provided a gear shaft ball lever 39 which is keyed to the said shaft 42, adjacent one end thereof. A steering gear shaft commutator body 44 is provided and disposed on the opposite end of said gear shaft 42 and a commutator contact bar segment 45 is inserted in the commutator body 44. The said commutator body 44 and segment 45 are held in place by nuts 43. A commutator contact brush 46 is disposed in the contact brush holder 47 and said brush 46 is adapted to contact said segment 45. The said segment 45 and said body 44 are secured to the shaft 42 by means of an insulated stud 55 and an insulated bushing 56.

A three point electric switch 48, as shown in Figs. 3, 4 and 6, is electrically connected to one pole of the battery or generator 49 and the other pole of said battery or generator 49 is connected to electromagnet coils 50 and 50a located on the rear axle housing 31. Said coils 50 and 50a are electrically connected in series. The said coil 50a is electrically connected with said switch 48 at contact point C. Said point C is electrically connected with the said contact brush 46 and the electric circuit continues through said segment 45 to nut 43 and from the nut 43 to the electric connection on switch 48 and contact point A.

I have shown a floating clutch type form of my invention in Figs. 8, 9 and 10, and which comprises a differential gear housing 51 mounted on side ball bearings 35. There is a floating type differential clutch ring and fork 52 and differential gear clutch shock absorber plugs 53 having metal caps 54 and which abut the stops on said housing 51. The said plugs 53 are mounted in said clutch ring 52 and are adapted to cushion the shock of the clutch teeth engagement.

The operation of my invention is as follows:

As shown in Fig. 1, when the clutch fingers 11 are disengaged from the side gear 23 by the clutch release coil spring 17, then normal differential action is restored and the axle shafts 24 are permitted to revolve at the same or different speeds depending upon road conditions and direction of travel.

Where, however, the road conditions are adverse and the operator of the motor vehicle desires to obtain positive driving action to both of the wheels (see Figs. 1, 2 and 3), then the said operator may close the switch 48, thereby energizing the coils 50 and 50a of the clutch engagement electromagnet 18 (see Figs. 3, 4, 5 and 6), thereby overcoming the force exerted by said spring 17 and causing the differential clutch gear teeth fingers 11 to mesh with said side gear 23. This action locks the differential gears and imparts positive driving action to both axle shafts 24 (see Fig. 1).

In addition to the switch 48 (see Figs. 3 and 4) there is provided an automatic electrical control affixed to the steering worm gear shaft 42 and comprising a commutator body 44 and an electrical contact segment 45 for the said differential clutch 10. This control will release the said differential clutch 10 (see Fig. 1) by breaking the electrical circuit wherever the motor vehicle is compelled to turn or change direction and thereby prevent undue stress on the differential mechanism and undue wear on the tires. The said automatic control will release the said clutch 10 whenever the front wheels of the vehicle are turned approximately five degrees or more from a straight line of travel.

The three point switch 48 (see Figs. 3 and 4) is designed to disconnect the automatic control. When normal differential operation is desired the contact lever is moved to point B. When positive differential action is desired the contact lever is moved to point C, causing the differential clutch to shift into engagement and thereby lock differential gears and axle shafts.

When the invention is utilized in the form shown in Figs. 8, 9, 10 and 11, the full floating clutch ring 52 is provided with shock absorbers 53 which abut the stops upon the differential gear housing 51 whenever the said clutch fingers 11 are engaged.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. In a mechanical and electrical device as described, the combination of an axle housing, having a differential bevel gear case and a differential side gear lock enclosed therein, said gear lock comprising a clutch ring having a fork thereon and slidably mounted on and driven by said gear case, removable bevel gear teeth-like clutch fingers on said fork, said clutch fingers engageable with the gear teeth on a differential bevel side gear, a double coil electromagnet mounted on said axle housing comprising magnetic twin coils and an armature and shaft, said armature mounted on one end of said shaft and a clutch ring fork shifter shoe mounted on the opposite end of said shaft, said shaft and shoe having means adapted to engage the said clutch ring fork fingers with bevel side gear teeth upon application of electrical energy to said magnet, a bearing bushing securely affixed to said axle housing and supporting said armature shaft, and a coil spring mounted on said bearing bushing to release the clutch ring fork fingers from the differential side gear teeth when the electrical circuit is open.

2. In a mechanical and electrical device as described, the combination of an axle housing, having a differential bevel gear case and a differential side gear lock enclosed therein, said gear lock comprising a clutch ring having a fork thereon and slidably mounted on and driven by said gear case, removable bevel gear teeth-like clutch fingers on said fork, said clutch fingers engageable with differential bevel side gear teeth, a twin iron clad solenoid electromagnet mounted on and magnetically insulated from said axle housing, said solenoid comprising a magnet, twin coils and a twin contact armature and shaft, said armature mounted on one end of said shaft and a clutch ring fork shifter shoe mounted on the opposite end of said shaft, said clutch ring being provided with a circumferential groove, and said shifter shoe slidably mounted in said groove and adapted to actuate the said clutch ring fork and fingers upon application of electrical energy to said magnet, a bearing bushing securely affixed to said axle housing and supporting said armature shaft, and a coil spring mounted on said bearing bushing adapted to release the clutch ring fork fingers from the differential side gear teeth when the electrical circuit is open.

3. In a mechanical device as described, the combination of a differential gear case with bevel gears, a differential gear lock mounted on and driven by said case, said gear lock having mechanical and electrical actuation means for exerting electrical force to move said gear lock elements, said gear lock comprising a floating clutch ring and fork with removable bevel gear teeth-like fingers mounted on said fork, said clutch ring slidably mounted on and driven by said case and said clutch ring fork and fingers adapted to move longitudinally and rotate partly on said gear case to achieve locking engagement of said fingers with the gear teeth of one bevel differential side gear upon application of said electrical force, shock absorbers mounted on said clutch ring fork and shock absorber stops on said gear case positioned so as to cushion the shock upon the engagement of said fingers with said side gear teeth of one bevel differential side gear.

4. In an automobile differential mechanism of the character described, the combination of a differential gear case with bevel differential side gears, a clutch ring and fork slidably mounted on and driven by said case, gear teeth-like fingers removably mounted on the free end of said fork, said fingers engageable with the gear teeth on one bevel differential side gear and control means for the clutch ring and fork to lock the differential action.

5. In an automobile differential mechanism of the character described, the combination of a differential gear case with bevel differential side gears, a clutch ring and fork slidably mounted on and driven by the said case, gear teeth-like fingers mounted on said fork and adapted to engage the gear teeth on one bevel differential side gear and means to engage and disengage said fingers with the gear teeth on said differential side gear.

6. In a mechanical and electrical device as described, the combination of an axle housing having a differential bevel gearing enclosed therein, said gearing comprising a differential bevel gear case with bevel side gears, a forked clutch ring slidably mounted on and driven by said gear case, said clutch fork having teeth-like fingers adapted to engage the gear teeth of one bevel side gear, a twin solenoid electromagnet mounted on said axle housing, mechanical control means connecting said solenoid and clutch ring, and electrical control means to energize said twin solenoid for holding said clutch ring fork fingers and said side gear teeth in driving relation to each other, and mechanical means for automatically holding said clutch ring fork fingers and said bevel side gear teeth in disengaged position.

7. In a mechanical and electrical device as described, the combination of an axle housing having a differential bevel gearing enclosed therein, said gearing comprising a differential bevel gear case with bevel side gears, a forked clutch ring slidably mounted and keyed on and driven by said gear case, said clutch fork having teeth-like fingers adapted to engage the gear teeth of one bevel side gear, a twin solenoid electromagnet mounted on said axle housing, mechanical means connecting said solenoid and clutch ring, an electrical control means comprising a source of electrical energy and a manually and automatically operable control means and an electrical circuit, said electrical circuit connecting said source of electrical energy with said solenoid and said solenoid and control means, said control means being located remote from said solenoid, said manual control comprising an electrical switch with an adjustable control arm and three contact points, first of said points providing an electrical circuit through said automatic control unit and to said solenoid, the second of said points being a neutral point and the third of said points providing an electrical circuit direct to said solenoid and by-passing said automatic unit control, the said arm upon contact with the first said point energizing said automatic control unit with the said solenoid and associated clutch elements, and said arm upon contact with the second said point de-energizing said solenoid and associated clutch elements, and said arm upon contact with the third said point energizing said solenoid and causes said clutch elements to move into engagement, said automatic control unit comprising a single segment electric commutator mounted on a steering wheel gear shaft and a commutator segment contact brush mounted on the steering gear case, said commutator adapted to rotate with the steering gear shaft and when electrical circuit is closed to energize said solenoid upon segment contact with said brush and to de-energize said solenoid when said segment contact with said brush is broken and mechanical means for automatically holding said clutch ring fork teeth-like fingers from said bevel side gear teeth in disengaged position.

8. In an automobile differential mechanism of the character described, the combination of a differential bevel gear case with bevel side gears, a driving member and a pair of rear axle shafts, a differential side gear lock having a clutch comprising a forked ring and bevel gear teeth-like fingers secured to the forked portion of said ring, said clutch slidably mounted on and driven by said case and with said teeth-like fingers adapted to engage the gear teeth of one bevel differential side gear to lock the differential action, and mechanical means to disengage said teeth-like fingers from the teeth of said bevel side gear and to hold said clutch fork in disengaged position to permit the differential mechanism to resume normal differential action and electrically operated means to engage said clutch teeth-like fingers with said bevel side gear teeth to lock said mechanism against differential action.

9. In a mechanical device as described, the combination of a differential gear case with the bevel side gears, and pinions, a differential gear lock mounted on and driven by said case, said gear lock having mechanical and electrical actuation means for exerting electrical force to move said gear lock elements, said gear lock comprising a floating clutch ring and fork with removable bevel gear teeth-like fingers mounted between said side gears on said fork, said clutch ring slidably mounted on and driven by said case and said clutch ring fork and fingers adapted to move longitudinally and rotate partly on said gear case to achieve locking engagement of said fingers with the gear teeth of one bevel differential side gear upon application of said electrical force, and removable shock absorbers comprising rubber plugs with metal contact caps mounted at a tangent on said clutch ring fork and shock absorber stops on said gear case positioned to contact said caps and to cushion the shock upon the engagement of said clutch fingers with said side gear teeth.

10. In a mechanical and electrical device as described, the combination of an axle housing having a differential bevel gearing enclosed therein, said gearing comprising a differential bevel gear case with bevel side gears and pinions, a floating clutch ring and fork slidably mounted on and driven by said gear case, said clutch fork having teeth-like fingers between said side gears and adapted to engage the gear teeth of one bevel side gear, said fork having limited longitudinal and rotational movement on said differential bevel gear case, and removable shock absorbers mounted at a tangent on said clutch ring fork comprising rubber plugs with metal contact caps and shock absorber stops on said gear case positioned to contact said caps and to cushion the shock upon engagement of said clutch fingers with said side gear teeth, and a twin solenoid electromagnet mounted on said axle housing, mechanical means connecting said solenoid and clutch ring, an electrical control means comprising a source of electrical energy and a manually and automatically operable control means and an electrical circuit, said electrical circuit connecting said source of electrical energy with said solenoid and said control means, said control means being located remote from said solenoid, the said manual control comprising an electrical switch with an adjustable arm and three contact points, first of said points providing an electrical circuit through said automatic control unit and to said solenoid, the second of said points being a neutral point and the third of said points providing an electrical circuit direct to said solenoid and by-passing said automatic unit control, the said arm upon contact with the first said point energizing said automatic control unit with the said solenoid and associated clutch elements, and said arm upon contact with the second said point de-energizing said solenoid and associated clutch elements, and said arm upon contact with the third said point energizing said solenoid and causes said clutch elements to move into engagement, said automatic control unit comprising a single segment electric commutator mounted on a steering wheel gear shaft and a commutator segment contact brush mounted on the steering gear case, said commutator adapted to rotate with the steering gear shaft and when electrical circuit is closed to energize said solenoid upon segment contact with said brush and to de-energize said solenoid when said segment contact with said brush is broken, and mechanical means for automatically holding said clutch ring fork teeth-like fingers from said bevel side gear teeth in disengaged position when the electrical circuit is open.

References Cited in the file of this patent
UNITED STATES PATENTS

| | | |
|---|---|---|
| 1,280,535 | Perko | Oct. 1, 1918 |
| 1,646,020 | Fottinger | Oct. 18, 1927 |
| 1,786,492 | Hustvet | Dec. 30, 1930 |
| 2,090,614 | Clerk | Aug. 14, 1937 |
| 2,180,597 | LeBus | Nov. 21, 1939 |
| 2,234,890 | Brousseau | Mar. 11, 1941 |

FOREIGN PATENTS

| | | |
|---|---|---|
| 459,638 | Germany | May 7, 1928 |
| 1,097,529 | France | Feb. 16, 1955 |